April 1, 1969  R. J. JORDAN ET AL  3,435,656
HARMONIC MOTION MEASURING DEVICE USING LASER TECHNIQUES
Filed April 29, 1966
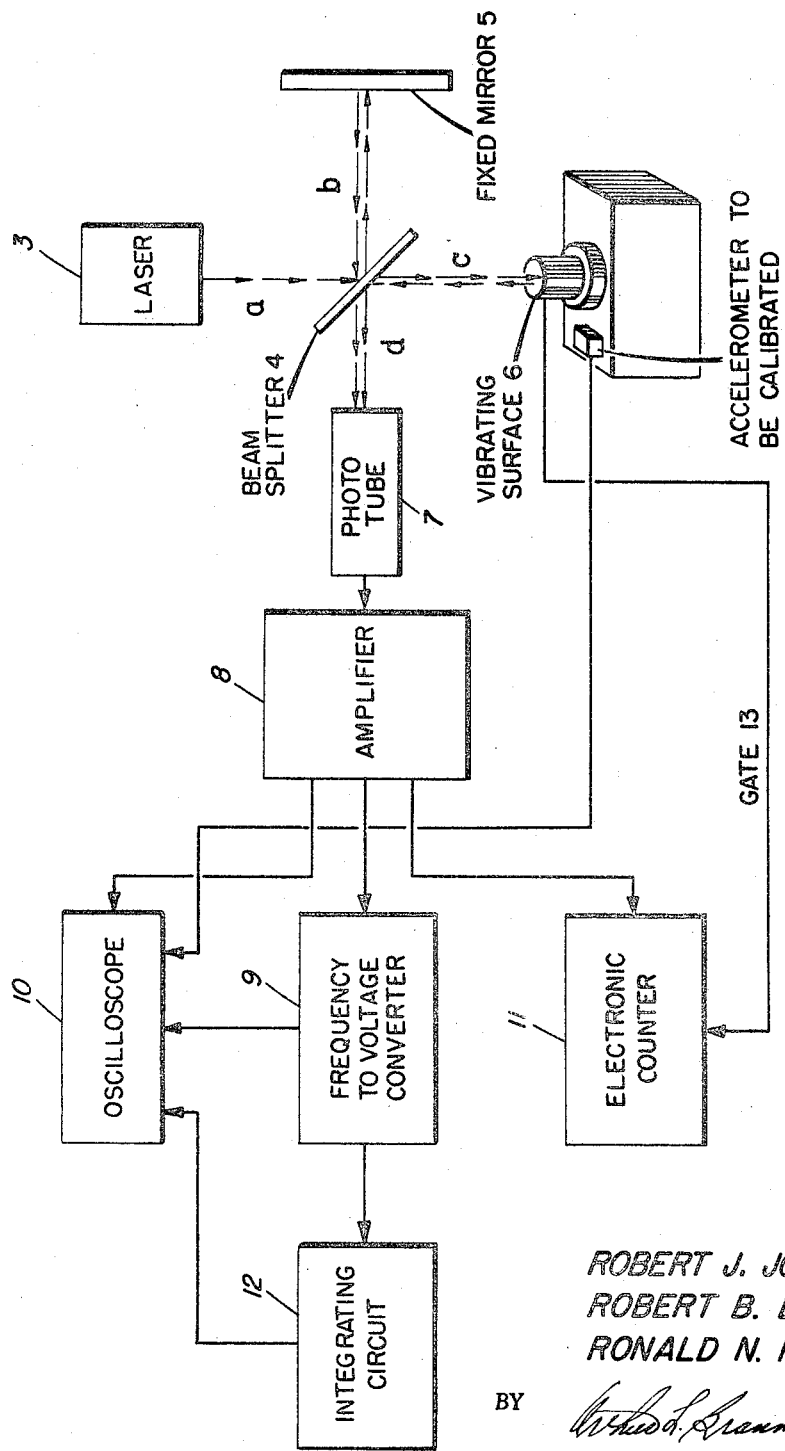
INVENTORS
ROBERT J. JORDAN
ROBERT B. DAVIS
RONALD N. PHILLIPS
BY
ATTORNEY

United States Patent Office 3,435,656
Patented Apr. 1, 1969

3,435,656
HARMONIC MOTION MEASURING DEVICE USING LASER TECHNIQUES
Robert J. Jordan, Leonardtown, Robert B. Davis, Hollywood, and Ronald N. Phillips, Leonardtown, Md., assignors to the United States of America as represented by the Secretary of the Navy
Filed Apr. 29, 1966, Ser. No. 547,710
Int. Cl. G01c 25/00
U.S. Cl. 73—1
2 Claims

ABSTRACT OF THE DISCLOSURE

A harmonic motion measuring device using laser techniques for the calibration of accelerometers. The accelerometer is placed on a vibrating surface and the laser beam is reflected from the vibrating surface via a mirror to a phototube. A frequency converter, electronic counter, and integrating circuit measures the Doppler shift caused by the movement of the laser beam reflected from the vibrating surface.

---

The invention described herein may be manufactured and used by or for the Government of the United States of America for governmental purposes without the payment of any royalties thereon or therefor.

The present invention relates to a harmonic motion measuring device using laser techniques and, more particularly, to an accelerometer calibrator using laser Doppler light shift techniques.

Previously, oscillatory movement of a mass was measured by various methods depending on the frequency of oscillation. At frequencies between zero and 50 cycles per second, oscillatory movement was measured using either long stroke mechanical or electro-mechanical techniques. As an alternative, a hydraulic shaker or dynamic centrifuge was used. In the case of a hydraulic shaker, read-out was achieved visually. In the case of a dynamic centrifuge, read-out was achieved through measurement of the speed of the two rotating tables and the length of the arm. These procedures were, in general, time consuming to set up and required calculation to arrive at the necessary frequency in amplitude values. Furthermore, errors of one percent or greater were common. In the frequency range of 50 cycles per second there was no simple method of accurately determining the amplitude of a vibrating mass. The most common procedure for measuring oscillations above 50 cycles per second was to send an accelerometer to the Bureau of Standards for calibration and then use this accelerometer as a secondary standard. At extremely high frequencies, the only method available was the fringe interferometer technique. This technique requires precise adjustment of the vibratory amplitude of a vibrating mass to cause interference fringes. This system is quite difficult to set up and provides no direct read-out amplitude, velocity or acceleration.

The general purpose of the present invention is to provide a harmonic motion measuring device which measures oscillatory displacements over a wide frequency range many times more accurately than any of the prior art devices. Furthermore, the present invention provides a direct read-out of the peak-to-peak displacement of vibrations of an oscillatory mass. In addition, the present invention provides a calibrator which features as a primary standard as opposed to the prior art calibrators which function as secondary standards. The present invention has the additional feature of providing a continuous measurement of the oscillations of a vibratory mass. Furthermore, the present invention has a much lower cost than comparable prior art devices.

An object of the present invention is the provision of an accurate measurement of motion of a moving mass using laser techniques.

A further object of the present invention is the provision of a continuous measurement of the displacement, velocity and acceleration of an oscillatory mass over a wide frequency range using laser Doppler light shift techniques.

Still another object of the present invention is to provide direct read-out of the peak-to-peak displacement of an oscillatory mass.

Other objects, advantages and novel features of the present invention will become apparent from the following detailed description of the invention when considered in conjunction with the accompanying drawing wherein:

The figure discloses an embodiment of the present invention.

Before describing the present invention in detail, it is useful to relate some of the theoretical aspects of the optical Doppler effect, to be distinguished from the acoustical Doppler effect, to the present invention. The observed frequency of light reflected off of a moving mass is given in Equation 1:

$$f_o = \frac{f_s \sqrt{1-\left(\frac{v^2}{c^2}\right)}}{1-v/c \cos \theta_0} \quad (1)$$

in which $v$ is the velocity of the source relative to the observer, $c$ is the speed of light and $\theta$ is the angle between the direction of $v$ and the axis of observation. In the operation of the present invention the angle between $v$ and the axis of observation is zero. Since the cosine of zero is 1, Equation 1 can be simplified and rewritten as follows:

$$f_o = f_s \sqrt{\frac{c}{c-v} + \frac{v}{c-v}} \quad (2)$$

Since the magnitude of the speed of light is so much greater than the speed of the source relative to the observer, the results of Equation 2 can be rewritten according to the following relatively accurate approximation:

$$f_o = f_s \sqrt{1 + \frac{v}{c}} \quad (3)$$

Equation 3 may be rewritten according to the power series in Equation 4:

$$f_o = f_s \left[1 + \frac{v}{c} + \frac{1}{2}\left(\frac{v}{c}\right)^2 + \ldots \right] \quad (4)$$

Since $v$ is so small relative to $c$, all second degree and higher terms may be neglected and Equation 4 may be rewritten as Equation 5:

$$f_o - f_s = f_s \frac{v}{c} \quad (5)$$

The difference between the frequency of the observed light signal and the frequency of the light source may be obtained by mixing the two light signals in a phototube and ultimately obtaining a voltage signal of frequency equal to the difference between the frequency of the two light signals. The frequency of the voltage signal obtained from the phototube mixer is commonly referred to as the beat frequency. Thus, it is seen that the beat frequency is proportional to the velocity of the source relative to the observer. Thus, Equation 5 may be rewritten in the form of Equation 6:

$$f_b = f_s \frac{v}{c} \quad (6)$$

in which $f_b$ is equal to the beat frequency. The displacement, D, of the source relative to the observer over a given period of time is equal to the integral of the velocity of the source relative to the observer with respect to time over a specified time period, beginning at T and ending at T' and may be expressed in the form of Equation 7:

$$D = \int_T^{T'} v\,dt \qquad (7)$$

From Equation 6, Equation 7 may be rewritten in the form of Equation 8:

$$D = \int_T^{T'} \frac{c}{f_s} f_b\,dt \qquad (8)$$

Since the speed of light divided by the frequency of the light source is equal to the distance per wave length, which may be designated λ, Equation 8 may be rewritten in the form of Equation 9:

$$D = \lambda \int_T^{T'} f_b\,dt \qquad (9)$$

Since the integral of the beat frequency with respect to time is equal to the number of cycles of the beat frequency signal, the displacement of the source relative to the observer may be obtained by multiplying the distance per wave length, λ, times the number of cycles of the beat frequency source or simply the product of the distance per wave length times the number of beats. If the source oscillates relative to the observer in simple harmonic motion, the location of the source at any given period of time is given by Equation 10:

$$x = D \sin 2\pi f_m t \qquad (10)$$

in which $f_m$ is the frequency of simple harmonic motion of the source relative to the observer. Under similar conditions, the velocity of the source relative to the observer during any point of time in the sinusoidal harmonic cycle can be calculated through Equation 11 and the acceleration at any point of time in the sinusoidal simple harmonic cycle can be calculated through the use of Equation 12:

$$v = 2\pi f_m D \sin^2 2\pi f_m t \qquad (11)$$

$$a = 4\pi^2 f_m^2 D^2 \sin^2 2\pi f_m t \cos 2\pi f_m t \qquad (12)$$

The above mathematical analysis provides the basis for the present invention.

Referring now to the figure wherein like reference characters designate like parts, light is emitted from laser source 3 and follows path *a* to a beam splitter 4 where the light beam is divided into two parts. One part of the light beam follows path *b* to a fixed mirror 5 and the other passes through the beam splitter 4 and follows path *c* to vibrating surface 6 where it is reflected. The light reflected by fixed mirror 5 returns by path *b* to beam splitter 4 and is divided once again into two paths. Part of the beam is reflected to path *a* and part of the beam follows path *d* to a phototube 7. The vibrating surface 6 reflects its light by path *c* to the beam splitter 4 where it is divided, part going by path *a* and part going by path *d* to phototube 7. The two beams received at the phototube from the fixed mirror 5 and the vibrating surface 6 are superimposed upon each other at phototube 7.

The light traveling to the vibrating surface 6 is continuously changing path length and the result is a Doppler shift of the frequency of that light. When the light traveling to vibrating surface 6 is mixed in phototube 7 with the light reflected by fixed mirror 5, a beat frequency signal is produced. This signal is amplified by an amplifier 8 which is a standard electrical amplifier. This beat frequency signal is proportional to the velocity of vibrating surface 6 and is defined by Equation 6. The velocity of the vibrating surface may be read-out through the use of a frequency-to-voltage converter 9 which monitors the velocity by simply generating a voltage level proportional to the beat frequency. Furthermore, a visual read-out of the cycle of oscillation of vibrating surface 6 may be obtained by monitoring the output of frequency-to-voltage converter 9 on the screen of an oscilloscope 10.

The displacement of vibrating surface 6 over any given period of time may be measured and read-out through an electronic counter 11 operative in conjunction with a gate arrangement 13. The displacement of vibrating surface 6 is obtained by applying Equation 9. Thus, the read-out of electronic counter 11 is obtained by multiplying the number of beats of the beat frequency signal over a specified period of time by the wave length of the light source. Gate 13 activates electronic counter 11 at the beginning of a period of time and deactivates it at the end of the period of time over which it is desired to measure the displacement of vibrating surface 6. If vibrating surface 6 oscillates in simple harmonic motion, the displacement over one cycle of oscillation may be obtained by activating electronic counter 11 at the beginning of that cycle and then de-activating it at the end of the cycle. Knowing the linear extremities of the path of vibrating surface 6 and the fact that it oscillates in simple harmonic motion, the velocity and the acceleration at any point of time during the motion may be calculated through the use of Equations 11 and 12, respectively. As stated above, the velocity may be read-out directly through frequency-to-voltage converter 9 or observed on the screen of the oscilloscope 10. Furthermore, since the acceleration is the rate of change of velocity, the acceleration may be read-out directly through integrating circuit 12 or it too may be observed on the screen of the oscilloscope 10. The complete system may be used to calibrate an accelerometer by attaching the accelerometer to vibrating surface 6 so as to move in unison with vibrating surface 6. The output of the accelerometer is monitored on oscilloscope 10. The accelerometer may be calibrated by observing its output under any condition of velocity or acceleration which is also monitored on oscilloscope 10. Thus, it is seen that the present invention is capable of giving a direct continuous read-out of the displacement, velocity and acceleration of a moving mass. Furthermore, the present invention is capable of calibrating any accelerometer by attaching the device to a moving mass and observing the response of the accelerometer for any given velocity or acceleration.

What is claimed is:

1. A device for measuring the displacement, velocity and acceleration of a moving mass using optical Doppler shift techniques comprising a light source;

means for splitting the light beam generated by said light beam source so as to direct only part of the beam toward said moving mass;

means for combining the part of the beam not directed toward the moving mass with the part of the beam reflected from said moving mass to obtain a beat frequency;

an electronic counter responsive to the combining means for counting the number of beats generated when the light beam reflected from the moving mass is shifted;

gate means for activating the counter at the beginning of the time period over which the displacement of the moving mass is to be measured and for deactivating said electronic counter at the end of the time period over which the displacement of the moving mass is to be measured; and read-out means for indicating the displacement of the moving mass.

2. A device for measuring the displacement, velocity and acceleration of a moving mass using optical Doppler shift techniques comprising a light source;

means for splitting the light beam generated by said light beam source so as to direct only part of the beam toward said moving mass;

means for combining the part of the beam not directed toward the moving mass with the part of the beam reflected from said moving mass to obtain a beat frequency;

a frequency-to-voltage converter responsive to the combining means to give an indication of the velocity of the moving mass;

an integrating circuit responsive to the output of the frequency-to-voltage converter to give an indication of acceleration of the moving mass; and read-out means connected to the output of the frequency-to-voltage converter and to the integrating circuit for displaying said velocity and said acceleration of the moving mass.

References Cited

UNITED STATES PATENTS

| | | |
|---|---|---|
| 2,971,364 | 2/1961 | Gatcomb. |
| 3,360,987 | 1/1968 | Flower _____ 73—71.3 |

S. CLEMENT SWISHER, *Primary Examiner.*

U.S. Cl. X.R.

73—71.3